United States Patent [19]

Inoue

[11] Patent Number: 4,520,252

[45] Date of Patent: May 28, 1985

[54] TRAVELING-WIRE EDM METHOD AND APPARATUS WITH A COOLED MACHINING FLUID

[75] Inventor: Kiyoshi Inoue, Tokyo, Japan

[73] Assignee: Inoue-Japax Research Incorporated, Yokohama, Japan

[21] Appl. No.: 395,633

[22] Filed: Jul. 6, 1982

[30] Foreign Application Priority Data

| Jul. 7, 1981 | [JP] | Japan | 56-106691 |
| Sep. 3, 1981 | [JP] | Japan | 56-131880[U] |
| Apr. 6, 1982 | [JP] | Japan | 57-56839 |
| Jun. 18, 1982 | [JP] | Japan | 57-104788 |

[51] Int. Cl.³ .............................................. B23P 1/08
[52] U.S. Cl. .............................. 219/69 M; 219/69 W; 219/69 D
[58] Field of Search ............... 219/69 D, 69 W, 69 M, 219/69 E, 69 R, 68; 204/129.6, 129.7

[56] References Cited

U.S. PATENT DOCUMENTS

| 3,553,415 | 1/1971 | Girard | 219/69 D |
| 3,626,137 | 12/1971 | Bertolasi | 219/69 D |
| 3,928,163 | 12/1975 | Ullmann et al. | 219/69 W |
| 4,317,019 | 2/1982 | Itoh | 219/69 D |

FOREIGN PATENT DOCUMENTS

| 2018130 | 5/1970 | France | 219/69 D |
| 1595 | 1/1977 | Japan | 219/69 W |
| 83528 | 6/1980 | Japan | 219/69 W |

*Primary Examiner*—M. H. Paschall
*Attorney, Agent, or Firm*—Karl F. Ross; Herbert Dubno

[57] ABSTRACT

A traveling-wire EDM method and apparatus in which a machining fluid in liquid phase is sufficiently cooled in its supply conduit to less than a predetermined critical temperature, e.g. 4° C. To this end, the wire electrode prior to introduction into the fluid supply nozzle may be cooled by passage through a refrigerant or by thermoelements. Preferably, the wire electrode is passed between a pair of ice-formed guide members disposed across the nozzle units. The eventual machining fluid may be gas or liquid in which fine ice particles or fragments are suspended.

31 Claims, 9 Drawing Figures

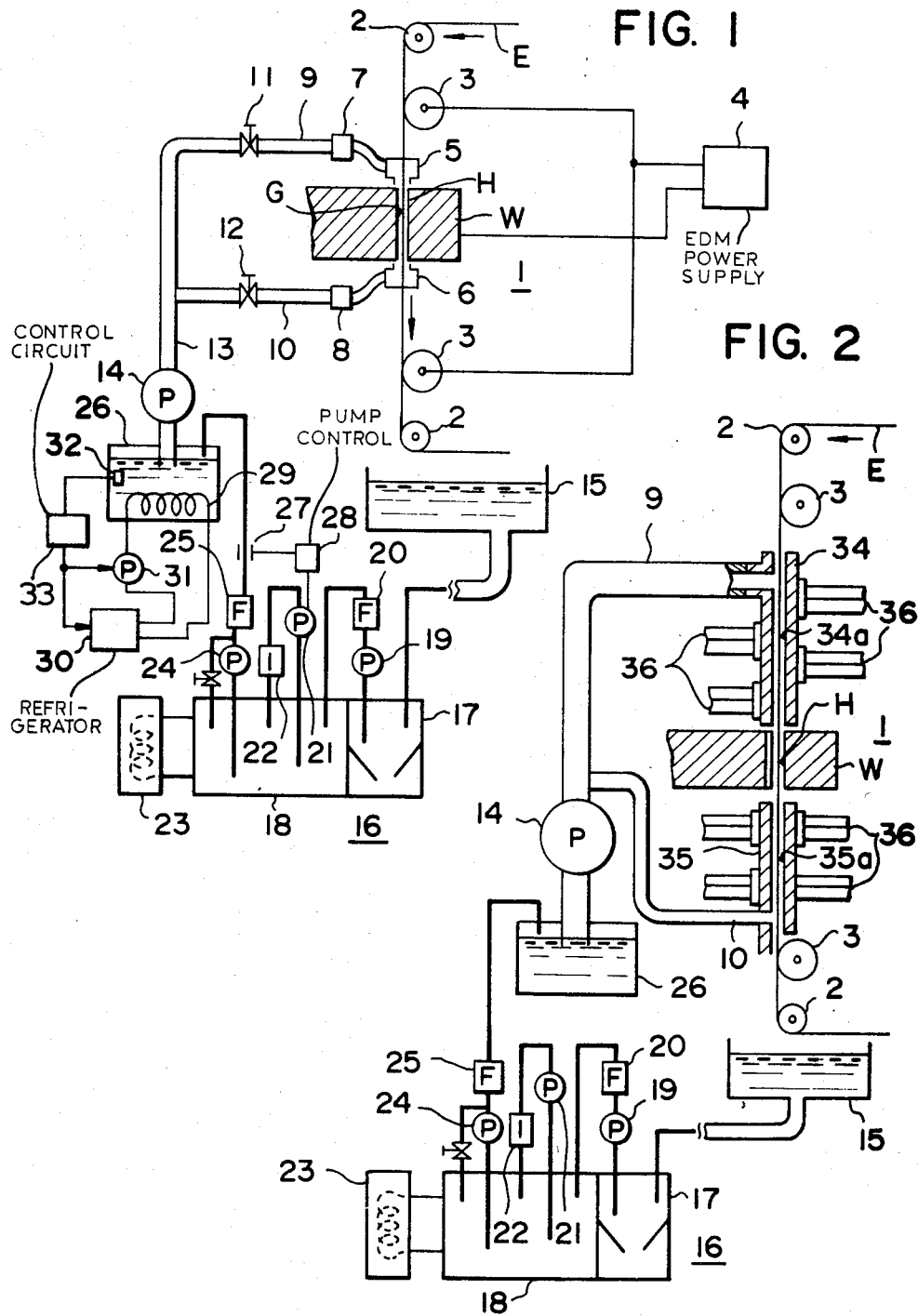

TRAVELING-WIRE EDM METHOD AND APPARATUS WITH A COOLED MACHINING FLUID

FIELD OF THE INVENTION

The present invention relates to traveling-wire EDM and, more particularly, to a new and improved method of and apparatus for electroerosively machining a workpiece with a traveling wire electrode in the presence of a machining fluid. By the term "wire electrode" is meant herein a thin, elongate electrode in the form of a wire, filament, ribbon or the like.

BACKGROUND OF THE INVENTION

As is well known, the traveling-wire EDM process makes use of a thin metallic wire composed, say, of copper or brass and having a diameter, say, of 0.1 to 0.5 mm. The wire may be continuously unwound from a supply reel and passed through a workpiece and taken up onto a takeup roller. In the path of wire travel, a pair of machining positioning guide members are arranged to support and guide the traveling wire in machining relationship with the workpiece. A machining fluid, typically distilled water, is supplied into the cutting zone from nozzle means which preferably comprises two nozzles disposed on the opposite sides of the workpiece, respectively. Preferably, the machining fluid is injected into the cutting zone from a nozzle coaxially with the traveling wire electrode. An EDM power supply is electrically connected to the wire electrode and the workpiece to apply a machining current, commonly in the form of a succession of electrical pulses, therebetween. Time-spaced, discrete electrical discharges are thereby created across the machining gap defined between the traveling wire electrode and the workpiece to electroerosively remove material from the workpiece. As electroerosive material removal proceeds, the workpiece is displaced relative to the axis of the traveling wire electrode transversely thereto along a predetermined path which determines a contour of cut eventually imparted to the workpiece.

During the traveling-wire EDM process, the machining liquid tends to be heated up by successive electrical discharges. It has now been found that a rise in temperature of the machining liquid, especially when constituted by a distilled water liquid, is a source of reduction in the cutting accuracy, insufficiency of the removal rate and wire breakage. As the water liquid is heated up, its specific resistivity lowers and deviates from the desired setting, resulting in an enlargement of the machining gap size and the consequent deviation of the overcut. Furthermore, the cooling capacity of the water liquid when heated is reduced and the consequent increase in liability of the wire to break requires that the machining current be limited to an unsatisfactory level.

OBJECTS OF THE INVENTION

The present invention accordingly seeks to provide an improved traveling-wire EDM method which enables the traveling wire electrode to be less liable to break, the machining accuracy to be increased, the machining stability to be improved and the EDM machining efficiency to be markedly increased, and further to provide an apparatus for carrying out the improved method.

SUMMARY OF THE INVENTION

In accordance with the present invention there is provided a method for machining a workpiece by electroerosion with a wire electrode wherein the wire electrode is axially displaced to traverse the workpiece between a pair of wire supply supporting members while defining a machining gap in an opening being developed in the workpiece, a machining fluid is injected into the workpiece opening from nozzle means adjacent to the workpiece and machining current is passed between the traveling wire electrode and the workpiece to create electrical discharges across the machining gap, thereby electroerosively removing material from the workpiece, which method comprises: providing the machining fluid in liquid phase in supply conduit means connected to the nozzle means; cooling the liquid in the supply conduit means; and pumping the fluid in the cooled liquid phase to feed it without a substantial rise in temperature via the nozzle means into the workpiece opening.

The machining fluid is, preferably, distilled water having a predetermined specific resistance given in the supply conduit means and cooled to less than a predetermined temperature, viz. generally less than 20° C., preferably less than 10° C. and more preferably less than 4° C. The predetermined specific resistance should preferably range between $5 \times 10^3$ and $5 \times 10^5$ ohm-cm.

Specifically, the machining fluid in liquid state is cooled by cooling the wire electrode in contact therewith, independently of cooling by the machining fluid. Alternatively, the wire electrode may be cooled by contact with the cooled machining fluid passing through the nozzle means disposed upstream of the workpiece opening. Thus, the wire electrode may be cooled within or upstream of the nozzle means disposed ahead of the workpiece.

In a further embodiment of the invention, the wire electrode is cooled at a temperature below the freezing point of the water and thereafter passed through the nozzle means fed with the distilled water liquid to allow a layer of ice to build up on the surface of the wire electrode and the latter to be cladded therewith prior to entry into the workpiece opening. The wire electrode may be cooled by bringing a refrigerant into contact therewith. Alternatively, the wire electrode may be cooled by passing the wire electrode through a wire guide member composed of ice and disposed ahead of the nozzle means.

In a still further embodiment of the present invention, the maching fluid is admixed with particles or fragments of ice prior to passage into the workpiece opening and preferably prior to passage out of said nozzle means.

The present invention also provides, in a second aspect thereof, an apparatus for machining a workpiece by electroerosion with a wire electrode wherein the wire electrode is axially displaced to traverse the workpiece between a pair of wire supporting members while defining a machining gap in an opening being developed in the workpiece, a machining fluid is injected into the workpiece opening from nozzle means adjacent to the workpiece and machining current is passed between the traveling wire electrode and the workpiece to create electrical discharges across the machining gap, thereby electroerosively removing material from the workpiece, which apparatus comprises: supply conduit means for providing the machining fluid in liquid phase; the said nozzle means connected to the supply conduit means for injecting the machining fluid into the workpiece opening; means in the supply conduit means for cooling the machining fluid in liquid phase; and means for pumping the fluid in the cooled liquid phase to feed it without a substantial temperature rise to the said nozzle means.

BRIEF DESCRIPTION OF THE DRAWING

These and other features of the present invention as well as advantages thereof will become more readily apparent from the following description of certain embodiments thereof when taken with reference to the accompanying drawing in which:

FIG. 1 is a diagrammatic view partly in section illustrating an apparatus embodying the principles of the present invention;

FIG. 2 is a similar view diagrammatically illustrating another embodiment of the invention in which thermoelements are used to cool the machining fluid in liquid phase;

SPECIFIC DESCRIPTION

Figure 3:
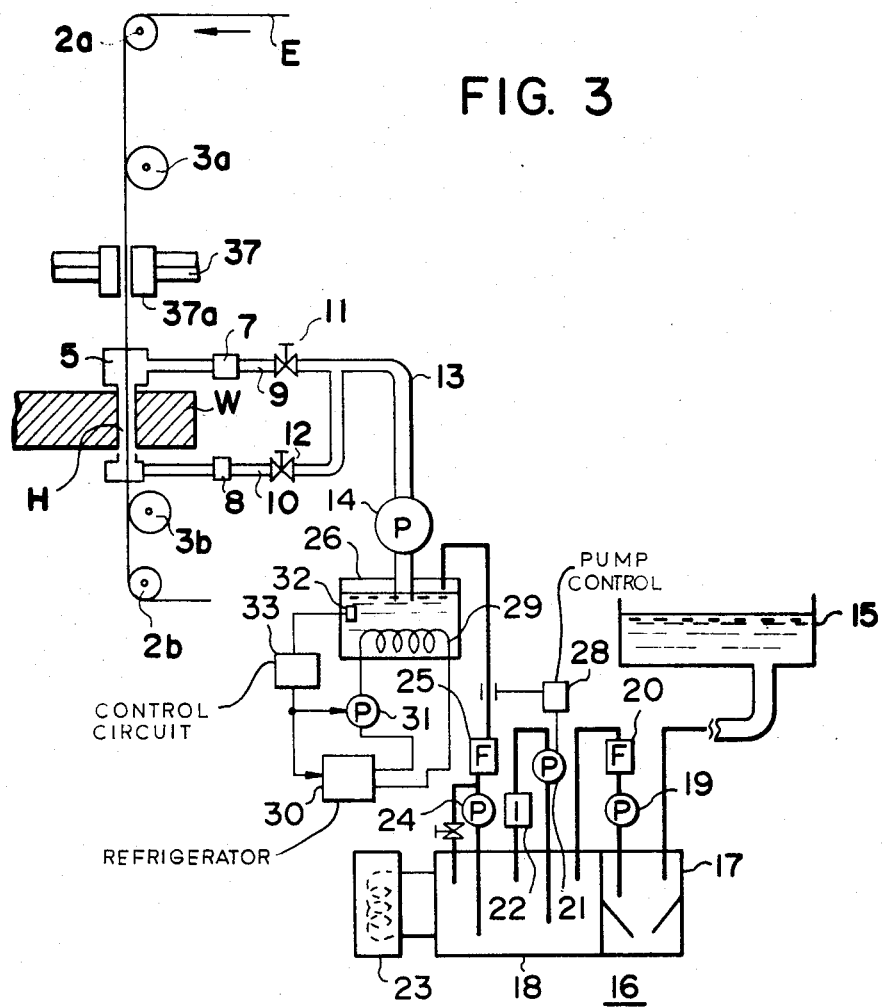
FIG. 3 is a silimar view diagrammatically illustrating still another embodiment of the invention to which the wire electrode is cooled by a thermoelement prior to passage through an upstream nozzle chamber.

Referring now to the drawing, there is shown a conventional traveling-wire EDM 1 arrangement incorporating the principles of the present invention embodied in various fashions.

The conventional traveling-wire EDM arrangement makes use of a continuous wire electrode E which is stored on, say, a supply reel not shown and dispensed therefrom, typically at a continuous rate, for cutting a workpiece W by electroerosion. The wire electrode E typically is composed of a copper or brass and has a diameter or thickness ranging between 0.05 and 1 mm.

As shown in FIG. 1, the wire electrode E is linearly bridged between a pair of guide members 2, here each in the form of a roller, and axially transported through the workpiece W disposed therebetween. The wire electrode E is shown traveling vertically from up to down through the workpiece W and in the direction indicated although it may be transported in the opposite direction. A pair of conductor rollers 3 are shown, one of which is held in contact with the traveling wire electrode E between the upper guide member 2 and the upper surface of the workpiece W and the other of which is held in contact with the travelinfg wire electrode E between the lower surface of the workpiece W and the lower guide member 2. The conductive rollers 3 are electrically connected to one terminal of an EDM power supply 4 whose other terminal is electrically connected to the workpiece W.

The wire electrode E leaving the lower guide member 2 is fed to a takeup reel or the like collection means (not shown). The wire electrode E is driven by a capstan and pinchroller unit (not shown) which is disposed between the collection means and the lower guide member 2 to establish a desired rate of travel of and a desired tension on the wire electrode E traveling through the workpiece W in conjunction with a braking unit (not shown) disposed between the supply reel and the upper guide member 2. The functions of the guide members 2 are to change the direction of wire travel at a right angle or so from the supply side to the machining zone and from the latter to the collection means, respectively, and to establish a linear traveling stretch of the wire electrode E across the workpiece W and through an opening or cut groove H therein.

Disposed immediately adjacent to the workpiece W are a pair of nozzles 5 and 6 fed with a machining fluid such as a water liquid to supply it into the opening H. The upper nozzle 5 is designed to create a downwardly directed stream of the machining fluid which is substantially coaxial with the traveling wire electrode E so as to be led into the opening H through the upper side of the workpiece W. Likewise the lower nozzle 6 is designed to create an upwardly directed stream of the machining fluid which is substantially coaxial with the traveling wire electrode E so as to be led into the opening H through the lower side of the workpiece W.

A machining gap G is formed in the opening H between the traveling wire electrode E and the workpiece W. With the wire electrode E and the workpiece W energized by the EDM power supply 4, a succession of time-spaced electrical discharges are produced through the machining gap G between the traveling wire electrode E and the workpiece W to electroerosively remove material from the workpiece W. As material removal proceeds, a worktable (not shown) on which the workpiece W is securely mounted is driven by a drive control unit (not shown) to displace the workpiece W in a horizontal X-Y plane transversely to the traveling wire electrode E along a preprogrammed cutting path which determines a desired contour of cut to be imparted to the workpiece W.

The nozzles 5 and 6 are securely supported in position by holders 7 and 8 so that they are held adjacent to the upper and lower surfaces of the workpiece W, respectively and so as to be coaxial with the traveling wire electrode E. It will be apparent that the holders 7 and 8 may be secured to upper and lower arms (not shown) to which the upper and lower guide rollers 2 are secured in position, respectively. The nozzles 5 and 6 are fed with the machining fluid by inlet conduits 9 and 10, which are carried by the holders 7 and 8 and connected via valves 11 and 12, respectively, to a supply conduit 13 leading from a pump 14. In accordance with a feature of the present invention, a provision is incorporated as will be described to assure that the temperature of the machining fluid for delivery into the opening H or the machining gap G is not in excess of 20° C., preferably of 10° C. or, more preferably, of 4° C., independently of the temperature of the environment in which the foregoing arrangement or the traveling-wire EDM machine is placed.

The spent machining fluid away from the workpiece W is allowed to fall by gravity and collected by a pan 15. The spent machining liquid which contains machining products, i.e. sludges, chips and other impurities. is then led to a liquid-treatment system 16 which includes two reservoirs 17 and 18. The first reservoir 17 is a sedimentation tank for receiving the spent machining liquid from the pan 15 to allow sludges and chips therein to be sedimented generally by gravity towards the bottom thereof. A clearer upper layer of the machining liquid in the first reservoir 17 is drawn by a pump 19 and passed through a filter 20 for reception in the second reservoir 18.

The second reservoir 18 is designed to treat especially the machining liquid when constituted by a water liquid. The water liquid in the reservoir 18 is recycled by a pump 21 through an ion-exchange cartridge 22 to control its specific conductivity or resistivity. The reservoir 18 is also equipped with a temperature-control or cooling unit 23 for sufficiently cooling the conductivity-adjusted water liquid therein.

The conductivity-adjusted water liquid is drawn from the tank 12b by a pump 24 and is thereby fed through an ultrafine filter 25 into a further reservoir or receptable 26. A conductivity (resistivity) detecting sensor 27 is provided between the filter 25 and the receptacle 26 and is electrically connected to a control circuit 28 which is designed to control the operation of the pump 21 in response to a deviation of the conductivity from a predetermined value, thereby maintaining constant the conductivity or resistivity of the water liquid furnished to the receptacle 26. When a deviation of the conductivity or resistivity from such a predetermined value is detected by the sensor 27, the control circuit 28 is operated to actuate the pump 21 or modify the rate of drive of a motor for the pump to circulate the water liquid or to control the rate of circulation of the water liquid in the reservoir 18 through the ion-exchange cartridge 22 until the predetermined conductivity or resistivity of the water liquid is restored.

The receptacle 26 is provided to temporarily store the purified and conductivity-adjusted water liquid therein and has a cooling coil 29 in contact with the stored water liquid. The cooling coil 29 is constituted by a conventional coiled heat-exchanger tubing having an outer wall in contact with the stored water-liquid and an inner passage traversed by a cooling medium such as ammonia or Freon. The cooling medium which is cooled by a refrigerator 30 is driven by a pump 31 to flow through the tubular passage of the coil 29 and is allowed to boil there to cool the water liquid in heat-exchanging relationship therewith. The receptacle 26 has also a temperature sensor 32 immersed in the stored water liquid to provide an electrical output signal representing the temperature thereof. The output signal of the sensor 32 is furnished to a control circuit 33, which has a predetermined threshold value preset therein and is connected to act on one or both of the refrigerator 30 or the pump 31. Thus, when the temperature of the water liquid is detected by the sensor 32 to exceed a maximum temperature corresponding to the preset threshold value, thus generally 20° C. and, in a preferred embodiment, 10° C. or 4° C., the rate of flow of the cooling medium through the coil 29 is controlled so as to hold the temperature of the stored water liquid not to exceed the preset temperature. The water liquid sufficiently cooled in this manner is drawn by the pump 14 and thereby fed into the workpiece opening H in the manner previously described.

EXAMPLE I

Figure 4:
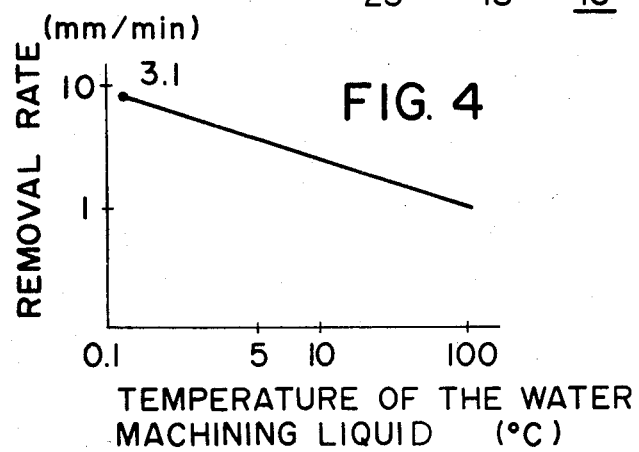
FIG. 4 is a graph illustrating results of experimentation in which the temperature of the water machining liquid is plotted along the abscissa and EDM removal rate is plotted along the ordinate.

A steel workpiece composed of S55C JIS (Japanese Industrial Standard) and having a thickness of 25 mm is machined using a brass wire electrode of a diameter of 0.2 mm and a water machining liquid of a specific resistance in the range of $10^4$ ohm-cm while varying the temperature of the machining liquid supplied into the region of the workpiece and the traveling wire electrode. It has been found that the removal rate varies in inverse proportion to the temperature of the machining liquid as depicted in the graph of FIG. 4 in which the abscissa represents the temperature and the ordinate represents the removal rate. Thus, the removal rate which is 2 mm/min when the machining liquid has a temperature of 25° C. is increased to 2.6 mm/min when the temperature is reduced to 10° C. The removal rate is further increased to 3.1 mm/min when the temperature is further reduced to 4° C. immediately above the temperature at which the machining liquid is frozen.

In the embodiment of FIG. 2 in which the same references as in FIG. 1 are used to designate the same parts, the machining liquid is subjected to cooling immediately prior to entry into the machining region. In this embodiment, each inlet conduit 9, 10 leading from the pump 14 is coupled with a cylinder or cylindrical collar 34, 35 constituting cooling means for the traveling wire electrode E. Thus, the cylinders 34 and 35 have their respective cylindrical inner passages 34a, 35a which are coaxial with each other and through which the wire electrode E is passed to traverse the workpiece W linearly between the wire guidance and support members 2. The machining liquid pumped through each inlet conduit 9, 10 is thus forced to flow and to be injected into the workpiece opening H in a stream coaxial with the traveling wire electrode E. The machining liquid when sufficiently cooled at the source side as described with reference to FIG. 1 therefore effectively cools the traveling wire E in the cutting zone.

Furthermore, the embodiment of FIG. 2 is designed to cool the wire-electrode E via the coaxially flowing envelope of machining liquid by externally cooling the cylinders 34 and 35. Each cylinder 34, 35 thus has a plurality of thermoelements 36 attached thereto, each of which constitutes an electric cooling system utilizing the Peltier effect. When contacted dissimilar metals are traversed by electric current, there develop at the junctions generation and absorption of heat which are reversible, depending on the directions of the electric current. By arranging the heat absorbing portion in contact with the outer wall of the cylinder 34, 35 to absorb the heat of the machining fluid passing through the internal passage 34a, 35a, the machining fluid is cooled to cool the traveling wire electrode E as well.

EXAMPLE II

A steel workpiece composed of SK JIS (Japanese Industrial Standard) and having a thickness of 50 mm is electroerosively machined with a brass wire electrode having a diameter of 0.2 mm and axially traveling at a rate of 3 m/min. A water machining liquid is supplied into the cutting zone at a volume flow rate of 5 liters/min and has a temperature at its source controlled to 10° C., yielding a removal rate of 0.8 mm/min. The removal rate is increased to 3 mm/min in an arrangement generally as shown in FIG. 2 when the cylindrical collars 34, 35 are cooled at a temperature of 1° C.

FIG. 3 shows another embodiment of the invention in which an electric cooling system as described in connection with FIG. 2 is used to cool the wire electrode E independently of the cooled machining fluid (refer to FIG. 1), thereby sufficiently holding the temperature of the machining liquid lowered below a threshold point at a supply site, viz. the receptacle 26, as it is fed coaxially with the traveling wire electrode E into the cutting zone H. Thus, the wire electrode E passing over the upstream guide member 2a and the upstream electricity-conducting roller 3a is passed proximal to or in contact with the heat-absorbing portion 37A of the thermoelement 37 as described, prior to entry into the upstream nozzle 5 through which the cooled machining liquid from the source, viz. the receptacle 26, is injected into the opening H in the workpiece W. The heat of the traveling wire electrode E is sufficiently absorbed by the thermoelement 37 to sufficiently cool the wire electrode E led into the machining liquid nozzle 5.

EXAMPLE III

Example I is followed except that the wire electrode E is cooled by a thermoelement 37 at a portion of its travel path between the upstream guide member 2a and conducting roller 3a. It is found that the removal rate is increased to 2.9 mm/min and 33 mm/min when the machining liquid is reduced in temperature at the source (viz. the system 16 and or the receptacle 26) to 10° C. and 4° C., respectively.

In addition, it should be noted that a water liquid may advantageously be supplied over or into a cavity in, the heat-absorption portion 37A of the thermoelement 37 so as to be partially frozen there to enhance the cooling of the wire electrode E.

It will be apparent that the present invention enables the traveling-wire EDM removal rate to be increased by nearly or even more than 50% over the conventional system. By limiting the machining liquid, especially water liquid, in temperature to a lower value, it is found that its specific resistivity can be substantially held to a fixed level favorable for EDM electroerosion. Since this allows the essential machining gap spacing to be effectively fixed at a constant value, the machining accuracy can be largely improved as well.

Figure 5:
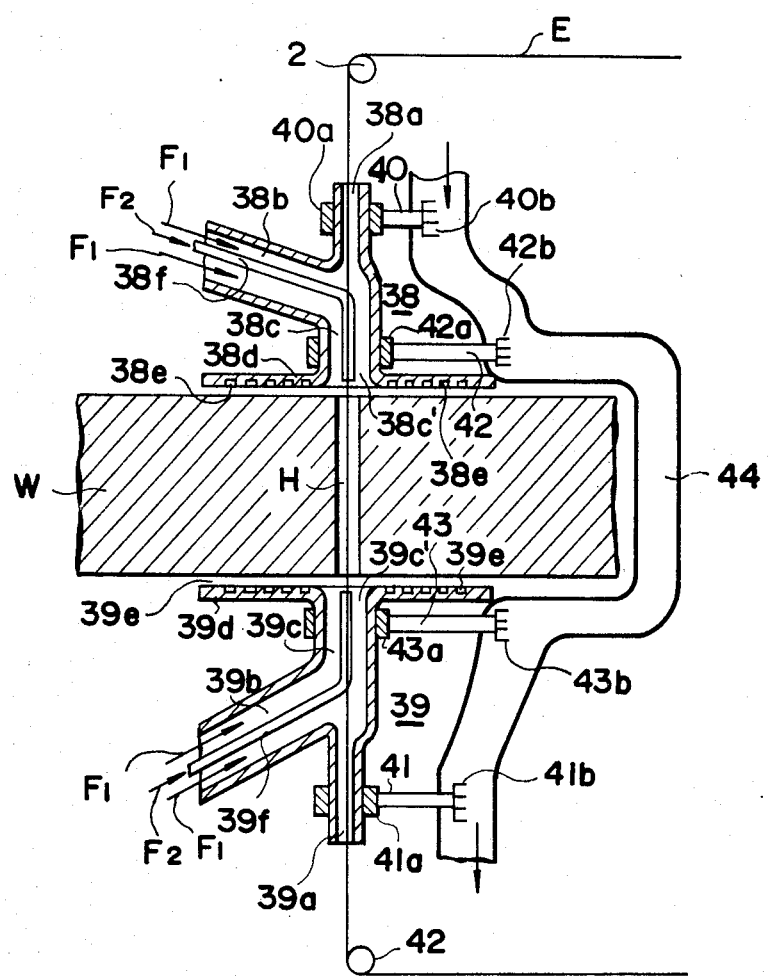
FIG. 5 is a longitudinal view, essentially in cross section, diagrammatically illustrating an improved fluid injection and cooling system embodying the present invention.

In FIG. 5 there is shown a further embodiment of the invention incorporating an improved machining fluid flushing and cooling arrangement. The arrangement includes a pair of nozzle assemblies 38 and 39, each of which comprises respectively a wire passage 38a, 39a coaxial with the wire electrode E, a fluid inlet 38b, 39b connected to a source of a water liquid (see FIG. 1), a nozzle chamber 38c, 39c open to the opening H in the workpiece W and an end flange 38d, 39 d extending radially about the end opening 38c', 39c' of the nozzle chamber 38c, 39c. The nozzle assemblies 38 and 39 may be secured to upper and lower arms (not shown) extending in parallel with one another from a vertical column (not shown) of a conventional traveling-wire EDM machine. Each fluid inlet 38b, 39b is fed with the water liquid to inject it through the nozzle chamber 38c, 39c into the workpiece opening H under an elevated pressure of 1 kg/cm² or more. Each flange 38d, 39d has an area several times greater than the cross-sectional area of the nozzle opening 38c', 39c' and closely adjacent to the workpiece W with a small spacing, say 2 mm or preferably 1 mm or less. By virtue of the provision of the flange portion 38c, 39c mentioned which substantially restains the supplied water liquid from escaping radially over the workpiece W, the improved nozzle assembly 38, 39 ensures a highly smoothed, effective and efficiency-enhanced delivery and renewal of the workpiece opening H with the supplied water machining liquid while maintaining the desirable injection pressure thereof.

The wire passage 38a, 39a in each nozzle assembly 38, 39 should be sufficiently elongated and narrow just to allow the wire electrode to be smoothly passed and to limit the machining liquid against leaking therethrough. Optionally, a seal member adapted to slidably accept the wire electrode therethrough may be plugged in each wire passage 38a, 39a.

Each flange member 38d, 39d may, as shown, be formed with grooves 38e, 39e thereon proximal to the workpiece W, which grooves are preferably spiral or labyrinthine to provide turbulence in the flow of the machining liquid tending to escape radially outwardly through the narrow spacing between the flange 38d, 39d and the workpiece W. By virtue of the formation of such, the machining liquid tending to more radially outwards is markedly limited. Each nozzle assembly 38, 39 may be composed of an electrically nonconductive material such as a synthetic resin. The flange 38d, 39d formed with the grooves 38e, 39e may be composed of a rubber. In this manner, each assembly 38, 39 can be held sufficiently close to the workpiece W to achieve the machining liquid delivery with an enhanced effectiveness, smoothness and efficiency. For example, a workpiece having thickness of 300 mm can be machined with a wire electrode having a diameter of 0.2 mm. It has been found that where the machining arrangement is, as is conventional, devoid of flanges 38d, 39d, the wire electrode is broken when the average machining current exceeds 9.2 amperes. When, however, the nozzle assemblies 38, 39 are each provided with a flange 38d, 39d as shown and having a diameter of 40 mm and formed with spiral or labyrinthine grooves 38e, 39f, there occurs no breakage of the wire electrode when the machining current is increased to as high as 12 amperes. The machining liquid is effectively injected into the workpiece opening H under a pressure of 2 kg/cm².

It is desirable that cooling means be provided to cool the machining liquid immediately prior to entry into the workpiece opening H and further to cool the wire electrode E at a site immediately upstream thereof for the reasons previously noted with reference to FIGS. 2 and 3. To this end, each nozzle assembly 38, 39, possibly except the flange 38d, 39d and the inlet conduit 38b, 39b is composed of a metal and has the tubular passages 38a, 39a and the nozzle chamber 38c, 39c provided with the respective heat-absorbing portions 40a, 41a, 42a, 43a of thermoelements 40, 41; and 42, 43, respectively. In addition, these thermoelements have their respective heat-emitting ends 40b, 41b, 42b and 43b, respectively, which are cooled by a coolant passing through a cooling conduit 44.

Each nozzle assembly 38, 39 is also shown provided with a further fluid inlet 38f, 39f which is narrower in cross section than and coaxial with the first fluid inlet 38b, 39b and the nozzle chamber 38c, 39c. Each second fluid inlet 38f, 39f is arranged to terminate and to be open immediately ahead of the workpiece opening H in the nozzle chamber 38c, 39c. It is desirable that the second fluid inlet 38f, 39f be supplied with a cooled hydrocarbon machining liquid F2 such as kerosene and the first fluid inlet 38b, 39b be supplied with the water liquid F1. The two liquids F1 and F2 are simultaneously supplied to the machining system in this manner whereby the second liquid F2 is at least predominantly injected through the second inlet conduit 38f into the workpiece opening H and the first liquid F1 is supplied as an auxiliary machining liquid for admixture with the primary, hydrocarbon machining liquid F2 or as an auxiliary working fluid exclusively functioned to cool and curtain the workpiece W and the wire electrode E. For the latter purpose, the water liquid F1 acts in the region between the open end of the second conduit 38f, 39f and the workpiece opening H as an envelope fluid to enclose the hydrocarbon liquid and is thereby forced to flow into regions other than the machining gap in the workpiece opening H and elsewhere outside the workpiece W.

Figure 6:
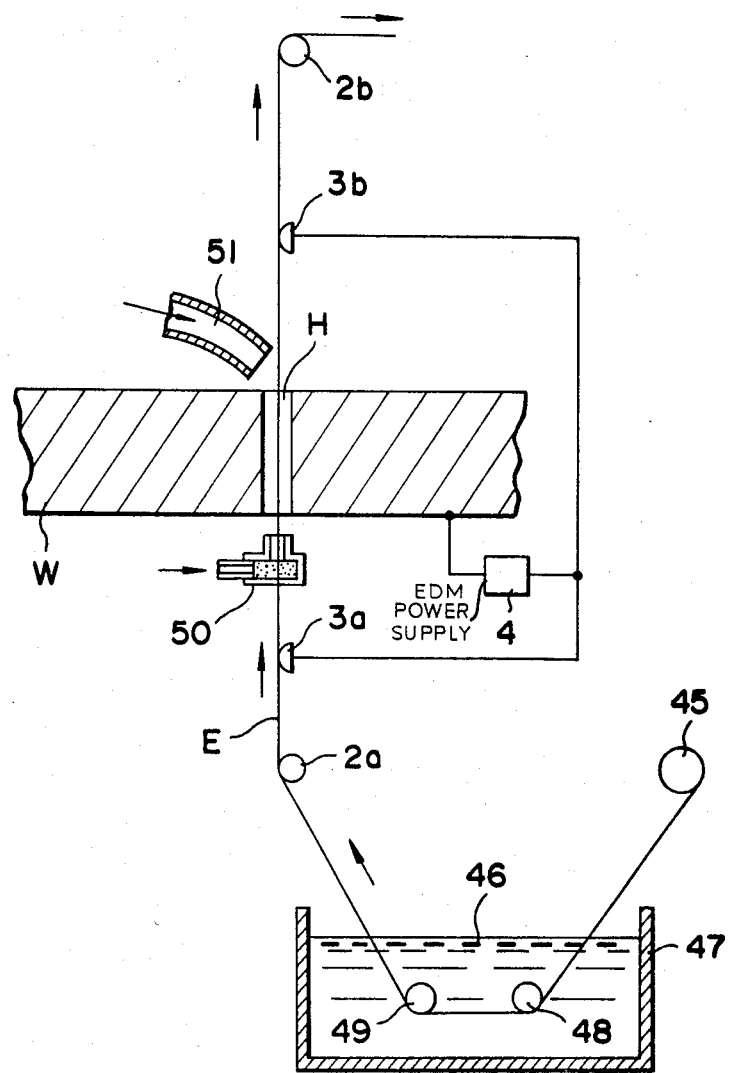
FIG. 6 is a similar view diagrammatically illustrating a further embodiment of the present invention in which a wire electrode prior to passage through the upstream nozzle unit is passed through a refrigerant so as to be cooled to less than the freezing point of the water.

In a further embodiment of the invention illustrated in FIG. 6, a wire electrode E unwound from a supply reel 45 is passed through a refrigerant 46 such as liquefied nitrogen retained in a container 47. The wire electrode E fed from the supply reel 45 enters into the refrigerant 46 in the container 47 and is guided over a pair of guide rollers 48 and 49 located therein. The wire electrode E is thereby cooled to a temperature lower than the freezing point of a water liquid. The wire electride E leaving the refrigerant 46 is then passed over the lower machining guide member 2a and a lower electricity-conducting brush 3a and fed through a lower fluid supply nozzle 50, a workpiece opening H, an upper electricity-conducting brush 3b and an upper machining guide member 2b, and eventually taken up into collection means (not shown). The lower nozzle 50 has a nozzle chamber and opening shown to be coaxial with the traveling wire electrode E as in the FIG. 1 arrangement. An upper nozzle 51 is shown to be a nozzle unit disposed by the traveling wire electrode E and trained towards the workpiece opening H but may be of the same type as the lower nozzle unit 50. Both nozzle units 50 and 51 are fed with a water liquid sufficiently cooled at its source to be a temperature below a predetermined level as described previously.

Since the wire electrode E is cooled below the freezing point of the water liquid prior to entry into the lower nozzle unit 50, it follows that an ice layer of the water develops on the surface of the wire electrode E passing out of the nozzle opening of the lower nozzle unit 50, that is a layer of water completely frozen or partially iced, e.g. in the form of sleet or snow, depending upon the particular rate of travel of the wire electrode and the particular reduced temperature of the supplied water liquid contacting the cooled wire electrode in the nozzle chamber. Since the wire electrode E fed into the cutting zone H is cooled enough, its heat capacity is markedly enhanced to absorb the machining heat there. In addition, the ice layer provides a temporary and/or localized protection against any possible damage from electrical discharges and mechanical damage, hence giving rise to an increased machining stability and removal rate. The discharge repetition or average machining current case be increased. The wire-electrode durability against breakage can be improved. It will be apparent that various modifications of the arrangement shown in FIG. 6 are possible. For example, the cooling means for the wire may not be limited to the use of a refrigerant such as nitrogen liquid. The wire reel itself may be cooled to around 0° C. or less. The wire electrode may, immediately prior to entry into the upstream nozzle unit 50, be passed through liquified carbon dioxide retained in a casing.

EXAMPLE IV

A steel workpiece composed of S55C JIS (Japanese Industrial Standard) and having a thickness of 25 mm is machined in an arrangement as generally shown in FIG. 6, using a water liquid having a specific resistivity of $5 \times 10^4$ ohm-cm and using a wire-electrode composed of brass and a diameter of 0.2 mm. The wire electrode is fed to axially travel at a rate of 3 m/min. The water liquid cooled to 5° C. at its source is allowed to be injected into the workpiece opening from the upper nozzle under a pressure of 0.3 kg/cm$^2$ and from the lower nozzle under a pressure of 1 kg/cm$^2$. The upper nozzle has its nozzle opening spaced by a distance of 3 mm from the upper surface of the workpiece while the lower nozzle has its nozzle opening spaced by a distance of 2 mm from the lower surface of the workpiece. With the wire electrode of a room temperature passed through the arrangement described, the removal rate is observed to be at maximum 2.0 mm/min. When, however, the wire electrode is passed through liquid nitrogen immediately prior to its passage into the lower nozzle, it is observed that an ice layer of water having a thickness of 0.045 mm develops on the surface of the wire electrode leaving the same nozzle and the removal rate is found to be increased to 2.5 mm/min.

Figure 7:
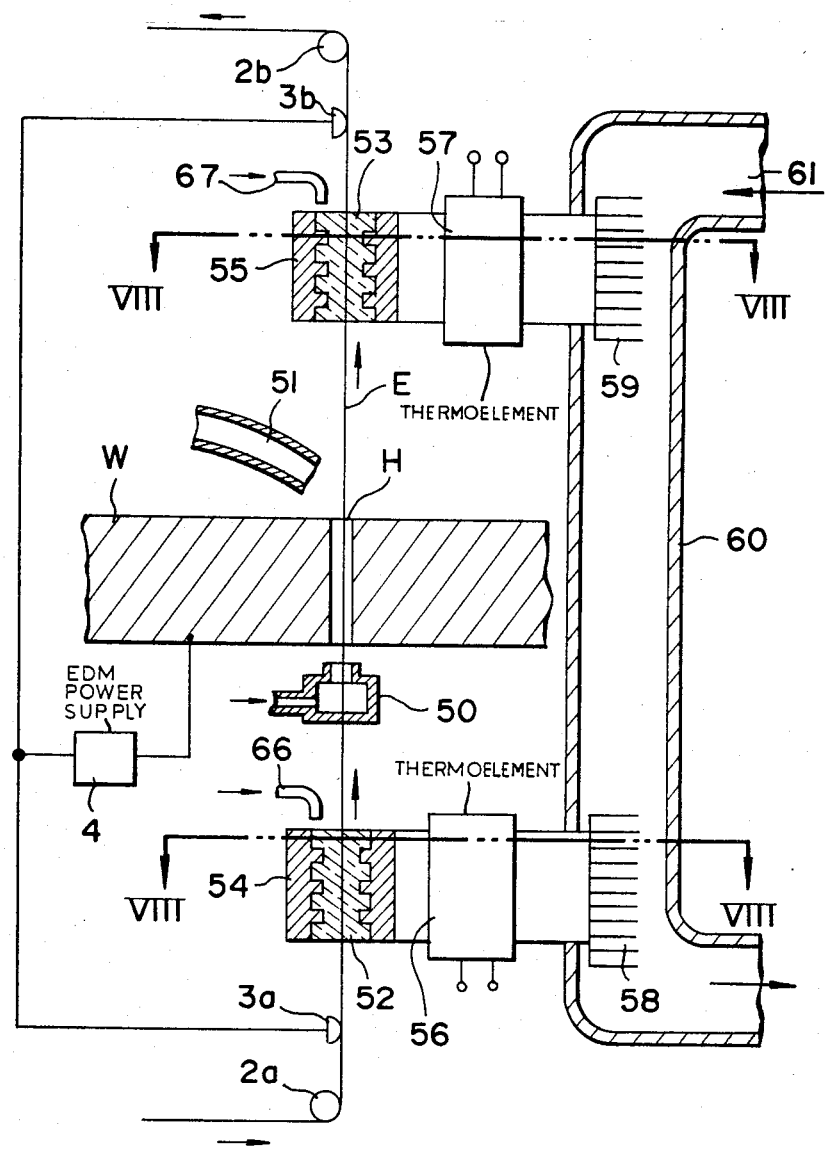
FIG. 7 is a similar view diagrammatically illustrating yet a further embodiment of the invention in which the wire electrode is passed between a pair of wire guide members composed of ice across the machining fluid supply nozzles.
Figure 8:
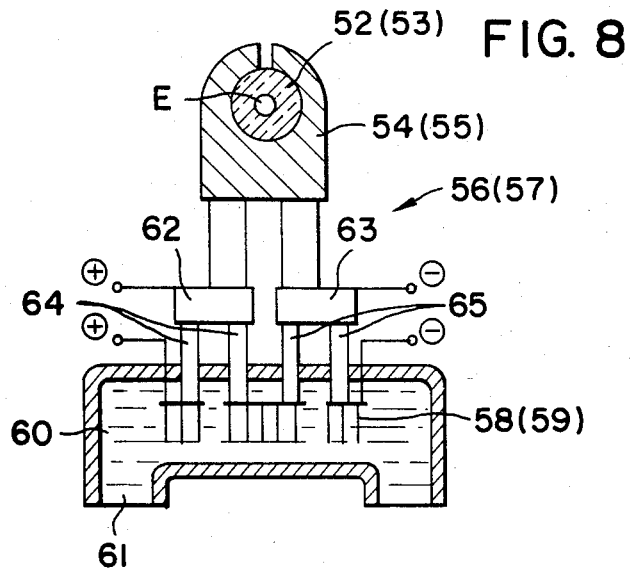
FIG. 8 is a cross-sectional view taken along the line VIII—VIII in FIG. 7.

In a modification of the arrangement of FIG. 6 shown in FIG. 7, the wire electrode E is guided through an ice guide member 52 provided immediately upstream of the upstream nozzle unit 50 and optionally also through an additional ice guide member 53 provided immediately downstream of the downstream nozzle unit 51. The ice guide members 52 and 53 are held by ice forming and retention members 54 and 55, respectively, which are connected to the cooling poles of thermoelements 56 and 57, respectively, which have their respective radiating fins 58 and 59 disposed in a conduit 60 in which a coolant 61 flows. Each thermoelement 56, 57 in which the heat-radiating fin 58, 59 is cooled by the coolant 61 is the arrangement that as shown in FIG. 8 the radiating fin 58, 59 and the cooling pole plate 62, 63 are connected by a semiconductor 64 (N-type), 65 (P-type). With an electric current passed through the latter, a heat-absorbing and cooling action is created at the plate 62, 63 and hence at the retention member 54, 55. In this manner, highly effective and efficient pre-cooling of the wire electrode E is achieved by the ice wire-supporting and guidance members of reduced temperature to enhance the EDM removal rate and to improve the EDM cutting performance while minimizing the possiblity of wire breakage. The water liquid containing a large number of ice particles or fragments and having a temperature slightly more or less than 0° C. is injected into the workpiece opening H from the nozzles 50 and 51. Designated at 66 and 67 (FIG. 7) are nozzles for replenishing a water liquid into the retention members 54 and 55, respectively, where the supplied water liquid is being frozen.

Figure 9:
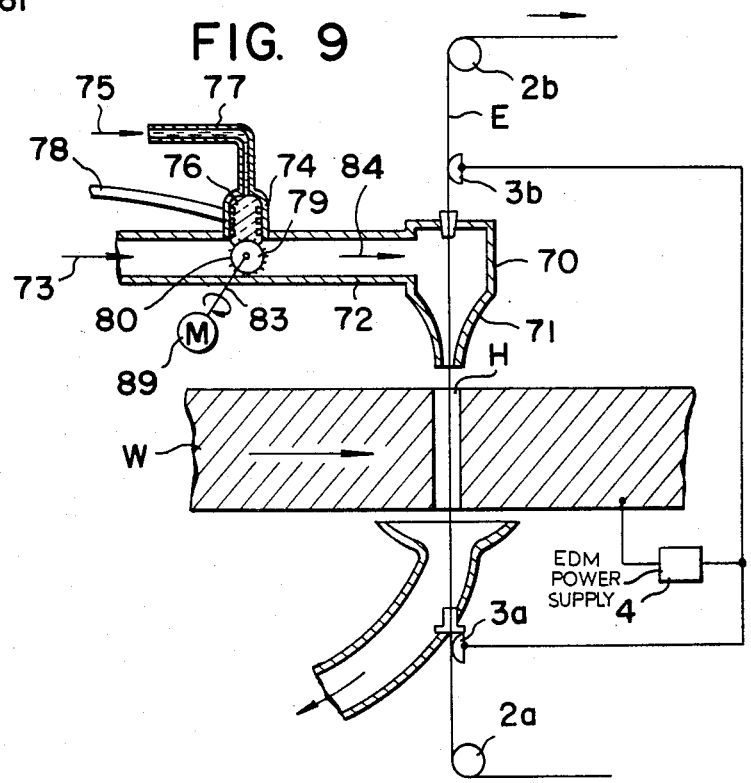
FIG. 9 is an essentially sectional view diagrammatically illustrating a still further embodiment of the invention in which the machining fluid, e.g. gas or liquid, is admixed with fine particles or fragments of ice prior to introduction into a nozzle.

In FIG. 9, the wire electrode E is shown as linearly bridging between the upstream and downstream machining guide members 2a and 2b and as traveling vertically through the workpiece opening H from down to up as in FIGS. 6 and 7. It should be noted, however, that the opposite direction of travel of the wire electrode may be employed and is often preferable especially with an arrangement which will now be described. In this embodiment as well, a nozzle chamber 70 has a nozzle opening 71 coaxial with the traveling wire electrode and trained into the working opening H. The nozzle chamber 70 has an inlet conduit 72 adapted to be fed with a fluid, e.g. water liquid 73 which has been sufficiently cooled at its source as described hereinbefore. Alternatively the fluid 73 may be a refrigerant gas. In this embodiment, however, there is further provided means for dispensing fine particles of ice 74 into the fluid 73. This means comprises an ice forming chamber 76 fed with a water liquid 75 through an inlet conduit 77 and opening into the water-liquid conduit 72. The chamber 76 is cooled by a thermoelement including a coupling 78 to freeze completely or partially the water liquid 75 supplied through the inlet conduit 77. The frozen water or ice 74 is ground by a grinding member 79 in the form of a roller having a multiplicity of grinding edges 89 and driven by a motor 89 via a drive shaft 83. Particulate ice is thus produced by the grinding edges and is mixed into the water liquid from its source to form a sleet thereof or a mixture 84.

EXAMPLE V

A water liquid having a specific resistivity of $10^5$ ohm-cm is ground by a grinder in an arrangement as generally shown in FIG. 9 to form ice particles, which are mixed at a proportion of 1/1 in and entrained on a flow of frozen nitrogen gas to form a mixture of a gas with the gas containing these particles. Thus gas/ice mixture fluid is injected into the workpiece opening H coaxially with the traveling wire electrode E. This has been found to increase the average machining current which is limited to 5 to 6 amperes simply with such a water machining liquid to about 10 amperes.

EXAMPLE VI

A machining fluid consisting of a distilled water liquid having a specific resistivity of $10^5$ ohm-cm containing sorbtol is cooled below a freezing point thereof ahead of an upstream nozzle as in the embodiment of FIG. 9 and injected therethrough into the cutting zone coaxially with a traveling wire electrode composed of 65% Cu and 35% Zn having a diameter of 0.2 mm. It is found that no breakage of the wire electrode occurs with the average machining current increased to 13 amperes.

EXAMPLE VII

A water machining liquid having a specific resistivity of $10^5$ ohm-cm is, after and without cooling below its freezing point, supplied onto the brass wire electrode of 0.25 mm diameter traveling into a cutting zone defined thereby with a S55C (Japanese Industrial Standard) workpiece of 100 mm thickness at a rate of travel of 4 meters/min. In each case, the minimum volume flow rate of the machining fluid required to avoid wire breakage and the resultant EDM removal rate are measured, yielding the following table:

| Machining Fluid | Minimium Volume Flow Rate | Removal Rate |
| --- | --- | --- |
| Distilled Water | 10 l/min | 92 mm$^2$/min |
| Not Cooled Distilled Water Cooled to Form Sleet-Like Fluid | 50 cc/min | 140 mm$^2$/min |

It will be apparent that according to the embodiment of the invention, only a considerably reduced amount of the water liquid is required, yet to yield a largely increased removal rate. In addition, adverse wire vibration is substantially reduced, thus improving the cutting accuracy in the finish range.

What is claimed is:

1. A method of machining a workpiece by electroerosion with a continuous wire electrode wherein the wire electrode is axially displaced to traverse the workpiece between a pair of wire supporting members while defining a machining gap in an opening being developed in the workpiece, a machining fluid is injected into the workpiece opening from at least one nozzle means adjacent to the workpiece, and electrical discharges are effected between the traveling wire electrode and the workpiece across the machining gap to electroerosively remove material from the workpiece, the method comprising the steps of:
   (a) providing a deionized water machining fluid in a liquid state having a specific resistance ranging between $5 \times 10^3$ and $5 \times 10^5$ ohm-cm in supply conduit means connected to said nozzle means;
   (b) cooling, in said conduit means, said deionized water machining fluid to a cooled liquid state of less than a predetermined temperature; and
   (c) pumping said deionized water machining fluid in the cooled liquid state to feed it without substantial temperature rise via said nozzle means into said workpiece opening.

2. The method defined in claim 1 wherein said predetermined temperature is 20° C.

3. The method defined in claim 1 wherein said predetermined temperature is 10° C.

4. The method defined in claim 1 wherein said predetermined temperature is 4° C.

5. The method defined in claim 1, further comprising the step of cooling said wire electrode prior to entry into said workpiece opening, by contacting, at least in said nozzle means, said cooled deionized water machining fluid fed from said conduit means with said wire electrode fed from wire supply means and traveling into said workpiece opening.

6. The method defined in claim 1 wherein said deionized water machining fluid in liquid state is brought together with said wire electrode fed from wire supply means in a region of wire travel path between said wire supporting members and is externally cooled to less than said predetermined temperature in said region.

7. The method defined in claim 1, further comprising the step of admixing, prior to entry of said machining fluid into said workpiece opening, particles or fragments of ice to produce said machining fluid in said cooled liquid phase.

8. The method defined in claim 7 wherein said cooled fluid is admixed with said particles or fragments prior to passage out of said nozzle means.

9. A method of machining a workpiece by electroerosion with a continuous wire electrode wherein the wire electrode is axially displaced to traverse the workpiece between a pair of wire supporting members while defining a machining gap in an opening being developed in the workpiece, a machining fluid is injected into the workpiece opening from at least one nozzle means adjacent to the workpiece, and electrical discharges are effected between the traveling wire electrode and the workpiece across the machining gap to electroerosively remove material from the workpiece, the method comprising the steps of:

(a) providing a deionized water machining fluid in a liquid state having a predetermined specific resistance in supply conduit means connected to said nozzle means;

(b) cooling, in said conduit means, said deionized water machining fluid to a cooled liquid state of less than a predetermined temperature; and (c) pumping said deionized water machining fluid in the cooled state to feed it without a substantial temperature rise via said nozzle means into said workpiece opening, said deionized machining fluid in liquid state being cooled by cooling, prior to contacting said machining fluid, said wire electrode to less than said predetermined temperature and passing said cooled wire electrode through a stream of said deionized water machining fluid in contact therewith directed to said workpiece opening.

10. The method defined in claim 9 wherein said wire electrode is cooled by passing said wire electrode traveling from wire supply means through a wire guide member composed of ice and disposed ahead of said nozzle means.

11. The method defined in claim 10 wherein said wire guide member is arranged to constitute one of said wire supporting members which is located on the side of said wire supply means.

12. An apparatus for machining a workpiece by electroerosion with a continuous wire electrode wherein the wire electrode is axially displaced to traverse the workpiece between a pair of wire supporting members while defining a machining gap in an opening being developed in the workpiece, a machining fluid is injected into the workpiece opening from nozzle means adjacent to the workpiece, and electrical discharges are effected between the traveling wire electrode and the workpiece across the machining gap to electroerosively remove material from the workpiece, the apparatus comprising:

supply conduit means for providing a deionized water machining fluid in liquid phase having a predetermined specific resistance;

said nozzle means connected to said conduit means for injecting said deionized water machining fluid into said workpiece opening;

means in said conduit means for cooling said deionized water machining fluid in liquid phase to less than a predetermined temperature; and means for pumping said fluid in the cooled liquid phase to feed it without substantial temperature rise to said nozzle means, said cooling means being disposed in the proximity of said wire electrode upstream of said nozzle means for cooling said wire electrode to allow said water machining fluid in liquid phase to be cooled thereby, said cooling means comprising means for bringing said wire electrode in contact with a refrigerant to cool it to a temperature below the freezing point of said water whereby the wire electrode when passing out of said nozzle means has an icy layer of the water formed on the surface thereof prior to entry into said workpiece opening.

13. An apparatus for machining a workpiece by electroerosion with a continuous wire electrode wherein the wire electrode is axially displaced to traverse the workpiece between a pair of wire supporting members while defining a machining gap in an opening being developed in the workpiece, a machining fluid is injected into the workpiece opening from nozzle means adjacent to the workpiece, and electrical discharges are effected between the traveling wire electrode and the workpiece across the machining gap to electroerosively remove material from the workpiece, the apparatus comprising:

supply conduit means for providing a deionized water machining fluid in liquid phase having a predetermined specific resistance;

said nozzle means connected to said conduit means for injecting said deionized water machining fluid into said workpiece opening;

means in said conduit means for cooling said deionized water machining fluid in liquid phase to less than a predetermined temperature;

means for pumping said fluid in the cooled liquid phase to feed it without a substantial temperature rise to said nozzle means; and means for admixing, prior to entry of said water machining fluid in said workpiece opening, particles of fragments of ice to produce said machining fluid in said cooled liquid phase.

14. A method of machining a workpiece by electroerosion with a continuous wire electrode wherein the wire electrode is axially displaced to traverse the workpiece between a pair of wire supporting members while defining a machining gap in an opening being developed in the workpiece, a machining fluid is injected into the workpiece opening from at least one nozzle means adjacent to the workpiece, and electrical discharges are effected between the traveling wire electrode and the workpiece across the machining gap to electroerosively remove material from the workpiece, the method comprising the steps of:

providing a deionized water machining fluid in a liquid state having a predetermined specific resistance in supply conduit means connected to said nozzle means;

cooling, in said conduit means, said deionized water machining fluid to a cooled liquid state of less than a predetermined temperature, said deionized water machining fluid in liquid state being brought together with said wire electrode fed from wire supply means in a region of wire travel path between said wire supporting members and being externally cooled to less than said predetermined temperature in said region;

cooling said wire electrode in a second region upstream of the first-mentioned region in the path of wire travel; and pumping said deionized water machining fluid in the cooled liquid state to feed it without a substantial temperature rise via said nozzle means into said workpiece opening.

15. The method defined in claim 14 wherein said second region is between one of said wire supporting members which is located on the side of said wire supply means and first-mentioned region.

16. A method of machining a workpiece by electroerosion with a continuous wire electrode wherein the wire electrode is axially displaced to traverse the workpiece between a pair of wire supporting members while defining a machining gap in an opening being developed in the workpiece, a machining fluid is injected into the workpiece opening from at least one nozzle means adjacent to the workpiece, and electrical discharges are effected between the traveling wire electrode and the workpiece across the machining gap to electroerosively removal material from the workpiece, the method comprising the steps of:

providing a deionized water machining fluid in a liquid state having a predetermined specific resistance in supply conduit means connected to said nozzle means;

cooling, in said conduit means, said deionized water machining fluid to a cooled liquid state of less than a predetermined temperature, said deionized water machining fluid in said cooled liquid state being brought together with said wire electrode fed from wire supply means in a region of wire travel path between said wire supporting members:

cooling said wire electrode in a second region upstream of the first-mentioned region in the path of wire travel; and pumping said deionized water machining fluid in the cooled liquid state to feed it without a substantial temperature rise via said nozzle means into said workpiece opening.

17. The method defined in claim 16 wherein said second region is between one of said wire supporting members which is located on the side of said wire supply means and the first-mentioned region.

18. The method defined in claim 16 wherein said wire electrode is cooled in said second region by passing said wire electrode through a wire guide member composed of ice and constituting one of said wire supporting members which is located on the side of said wire supply means.

19. The method defined in claim 17 wherein said wire electrode is cooled in said second region by passing said wire electrode through a wire guide member composed of ice and located between said one wire supporting member and the first-mentioned region.

20. An apparatus for machining a workpiece by electroerosion with a continuous wire electrode wherein the wire electrode is axially displaced to traverse the workpiece between a pair of wire supporting members while defining a machining gap in an opening being developed in the workpiece, a machining fluid is injected into the workpiece opening, and electrical discharges are effected between the traveling wire electrode and the workpiece across the machining gap to electroerosively remove material from the workpiece, the apparatus comprising:

supply conduit means for providing a deionized water machining fluid in liquid phase having a specific resistance ranging between $5 \times 10^3$ and $5 \times 10^5$ ohm-cm;

means in said conduit means for cooling said deionized water machining fluid in liquid phase to less than a predetermined temperature;

nozzle means disposed adjacent to the workpiece and connected to said conduit means for injecting said cooled, deionized water machining fluid into said workpiece opening; and means for pumping said fluid in the cooled liquid phase to feed it without a substantial temperature rise to said nozzle means.

21. The method defined is claim 20 wherein said wire electrode is cooled by bringing a refrigerant into contact therewith.

22. The apparatus defined in claim 20 wherein said supply conduit means includes a cylindrical collar of a thermally conductive material integral with said nozzle means and coaxial with said wire electrode traveling from wire supply means, and a thermoelement having a heat-absorbing portion coupled with said cylindrical collar for cooling said water machining fluid in liquid phase passed therethrough.

23. The apparatus defined in claim 20, further comprising second cooling means for cooling said wire electrode independently of said water machining fluid.

24. The apparatus defined in claim 23 wherein said second cooling means is disposed in the proximity of said wire electrode upstream of said nozzle means for cooling said wire electrode to allow said water machining fluid in liquid phase to be cooled thereby.

25. The apparatus defined in claim 24 wherein said second cooling means comprises a thermoelement.

26. The apparatus defined in claim 20 further comprising a wire guide member composed of a frozen liquid and disposed upstream of said nozzle means in the path of wire travel.

27. The apparatus defined in claim 20 wherein said cooling means comprises a receptacle disposed in said supply conduit means for retaining said water machining fluid in liquid phase therein and having a cooling coil immersed in the latter and in which a coolant is circulated.

28. The apparatus defined in claim 27, further comprising sensing means in contact with said machining fluid in said receptacle for sensing the temperature thereof to control the rate of circulation of said coolant through said coil, thereby cooling said water machining fluid to less than said predetermined temperature.

29. A method of machining a workpiece by electroerosion with a continuous wire electrode wherein the continuous wire electrode is axially displaced to traverse the workpiece between a pair of wire supporting members while defining a machining gap in an opening being developed in the workpiece, at least one nozzle means directed to said workpiece opening is supplied with a water machining fluid, and electrical discharges are effected between the traveling wire electrode and the workpiece across the machining gap to electroerosively remove material from the workpiece, the method comprising the steps of:

cooling, upstream of said nozzle means disposed ahead of the workpiece, said traveling wire electrode to a temperature below a freezing point of said water fluid; and passing the cooled traveling wire electrode through said nozzle means fed with said fluid in liquid state to allow a layer of ice of build up on the surface to the traveling wire electrode and the latter to be cladded therewith prior to entry into said workpiece opening.

30. A method of machining a workpiece by electroerosion with a continuous wire electrode wherein the continuous wire electrode is axially displaced to traverse the workpiece between a pair of wire supporting members while defining a machining gap in an opening being developed in the workpiece, a machining medium is injected into the workpiece opening from at least one nozzle means adjacent to the workpiece, and electrical discharges are effected between the traveling continuous wire electrode and the workpiece across the machining gap to electroerosively remove material from the workpiece, the method comprising the steps of:

freezing a water liquid having a predetermined specific resistance to form a quantity of ice;

grinding said quantity of ice into particles or fragments thereof; and injecting a stream of said particles or fragments as said machining medium into said machining gap.

31. A method of machining a workpiece by electroerosion with a continuous wire electrode wherein the continuous wire electrode is axially displaced to traverse the workpiece between a pair of wire supporting members while defining a machining gap in an opening being developed in the workpiece, a machining medium is injected into the workpiece opening from at least one nozzle means adjacent to the workpiece, and electrical discharges are effected between the traveling continuous wire electrode and the workpiece across the machining gap to electroerosively remove material from the workpiece, the method comprising the steps of:

forming a stream of particles of fragments of ice; and injecting said stream as said machining medium into said machining gap.

* * * * *